United States Patent
Gu

(10) Patent No.: US 9,303,883 B2
(45) Date of Patent: Apr. 5, 2016

(54) DEHUMIDIFIER AIR FILTER SYSTEM

(71) Applicant: Keidy Gu, San Marino, CA (US)

(72) Inventor: Keidy Gu, San Marino, CA (US)

( * ) Notice: Subject to any disclaimer, the term of this patent is extended or adjusted under 35 U.S.C. 154(b) by 131 days.

(21) Appl. No.: 14/268,195

(22) Filed: May 2, 2014

(65) Prior Publication Data

US 2015/0316274 A1    Nov. 5, 2015

(51) Int. Cl.
| | | |
|---|---|---|
| *F24F 3/14* | (2006.01) | |
| *F24F 13/02* | (2006.01) | |
| *F24F 13/08* | (2006.01) | |
| *F24F 13/28* | (2006.01) | |
| *B01D 53/26* | (2006.01) | |

(52) U.S. Cl.
CPC . *F24F 3/14* (2013.01); *B01D 53/26* (2013.01); *F24F 13/02* (2013.01); *F24F 13/08* (2013.01); *F24F 13/28* (2013.01)

(58) Field of Classification Search
CPC .. B01D 47/06; B01D 46/001; B01D 53/0462; B01D 46/10; B01D 46/0001; B01D 46/0005; B08B 15/02; B08B 15/04; F24F 3/1405; F24F 13/20; F24F 3/14; F24F 3/1603
USPC ............. 55/419, 350.1, 467, 385.2, 471, 357; 55/356; 454/187; 165/138; 219/400
See application file for complete search history.

(56) References Cited

U.S. PATENT DOCUMENTS

| | | | | |
|---|---|---|---|---|
| 5,389,120 A * | 2/1995 | Sewell | ............. | B01D 47/06 55/419 |
| 5,417,729 A * | 5/1995 | Greenleaf, Sr. | ...... | B01D 46/001 55/350.1 |
| 6,616,720 B1 * | 9/2003 | Smith | ............. | B08B 15/002 454/187 |
| 6,623,550 B2 * | 9/2003 | Shah | ............. | B01D 53/0462 55/385.2 |
| 7,416,574 B2 * | 8/2008 | Udagawa | ......... | B01D 46/0001 219/400 |
| 8,002,868 B2 * | 8/2011 | Kim | ............. | F24F 13/20 165/138 |
| 8,273,144 B2 * | 9/2012 | Shore | ............. | F24F 3/1603 55/467 |
| 8,460,417 B2 * | 6/2013 | Reid | ............. | B08B 15/04 55/356 |
| 2001/0037630 A1 * | 11/2001 | Eom | ............. | F24F 3/1405 55/467 |
| 2004/0211162 A1 * | 10/2004 | Henrikson | ......... | B01D 46/10 55/385.2 |
| 2007/0193234 A1 * | 8/2007 | Fox | ............. | B01D 46/0005 55/471 |
| 2012/0137641 A1 * | 6/2012 | Thrush | ............. | F24F 3/14 55/357 |
| 2012/0180655 A1 * | 7/2012 | Law | ............. | F24F 3/1603 95/1 |

* cited by examiner

*Primary Examiner* — Duane Smith
*Assistant Examiner* — Minh-Chau Pham
(74) *Attorney, Agent, or Firm* — Clement Cheng

(57) ABSTRACT

A dehumidifier air filter system has: a dehumidifier module; a scrubber module; a dehumidifier adapter connected to the dehumidifier module; an air duct connecting the dehumidifier module to the scrubber module, and an air control window formed on the dehumidifier adapter. The air duct connects to the dehumidifier module at the dehumidifier adapter. The dehumidifier air filter system may be constructed with a front shell forming a housing for the dehumidifier apparatus within the dehumidifier module. The front shell has a front shell aperture. The front shell aperture receives the dehumidifier adapter, and the dehumidifier adapter is formed as a plate having at least two openings including: an air control window opening, and a ducting hose connector opening.

6 Claims, 7 Drawing Sheets

HEPA Air Scrubber Schematic Drawing

DEHUMIDIFIER AIR FILTER SYSTEM

FIELD OF THE INVENTION

The present invention is in the field of dehumidifiers.

DISCUSSION OF RELATED ART

A variety of different dehumidifiers have been implemented for lowering the humidity of controlled air spaces. Certain workspaces have a problem with humidity and airborne particles. In particular, pet grooming salons, industrial kitchens and factories tend to have a problem with humidity and airborne particles. Traditional commercial dehumidifiers can not be used in certain areas such as a pet grooming salon because the filter system tends to pick up too much animal hair.

SUMMARY OF THE INVENTION

The object of the invention is to provide a clean and dry workspace environment in a portable modular system.

A dehumidifier air filter system has: a dehumidifier module; a scrubber module; a dehumidifier adapter connected to the dehumidifier module; an air duct connecting the dehumidifier module to the scrubber module, and an air control window formed on the dehumidifier adapter. The air duct connects to the dehumidifier module at the dehumidifier adapter.

The dehumidifier air filter system may be constructed with a front shell forming a housing for the dehumidifier apparatus within the dehumidifier module. The front shell has a front shell aperture. The front shell aperture receives the dehumidifier adapter, and the dehumidifier adapter is formed as a plate having at least two openings including: an air control window opening, and a ducting hose connector opening.

The front shell aperture slot is formed on the periphery of the front shell aperture. The front shell aperture slot is formed by a flange bracket that is connected to the front shell at connection points. The air duct has two modes including an expanded deployed mode and a contracted stowed mode. The air duct is at least 10 feet long when extended.

The air duct is configured to be connected to a ducting hose connector rim formed on the dehumidifier adapter at a ducting hose connector opening. The dehumidifier adapter has a pair of openings for receiving a pair of air control windows. The air control windows are formed as a frame adapted to retain air control window filters. The dehumidifier air filter system optionally includes an in-line fan mounted to the air duct between dehumidifier module and the scrubber module.

DETAILED DESCRIPTION OF THE PREFERRED EMBODIMENT

Figure 1:
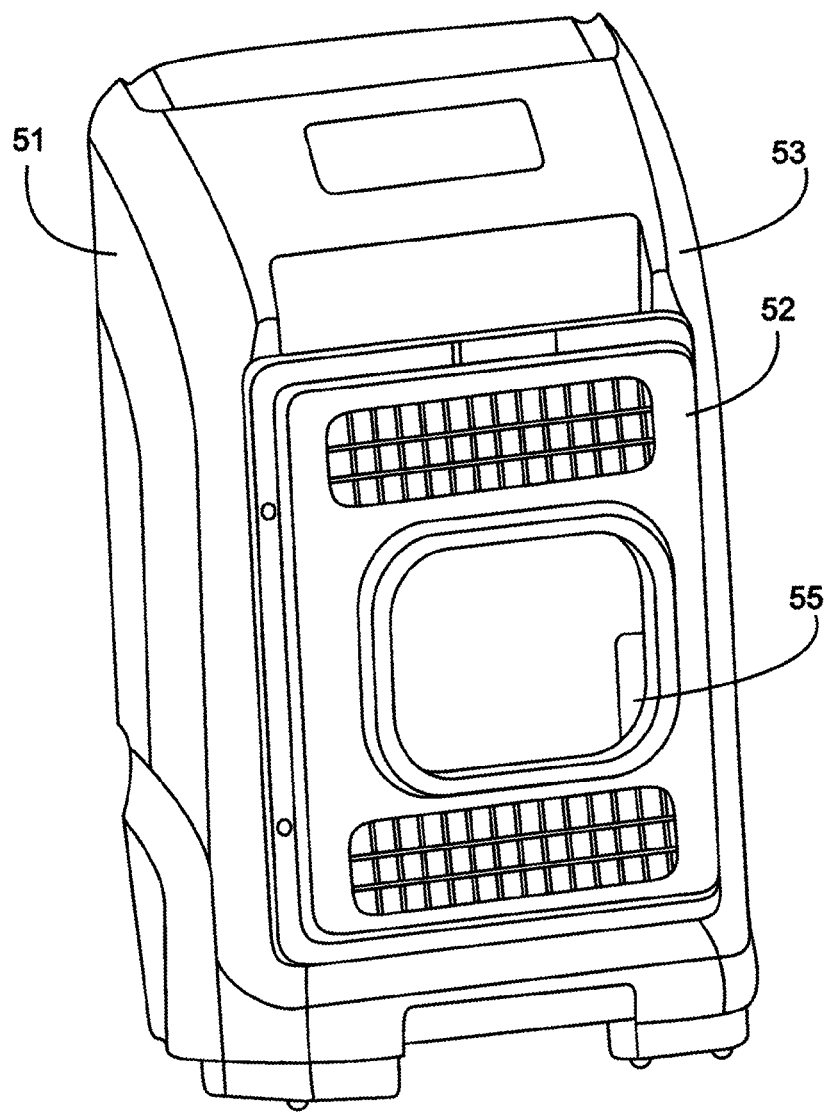
FIG. 1 is a perspective view of the dehumidifier adapter as mounted on the dehumidifier.
Figure 2:
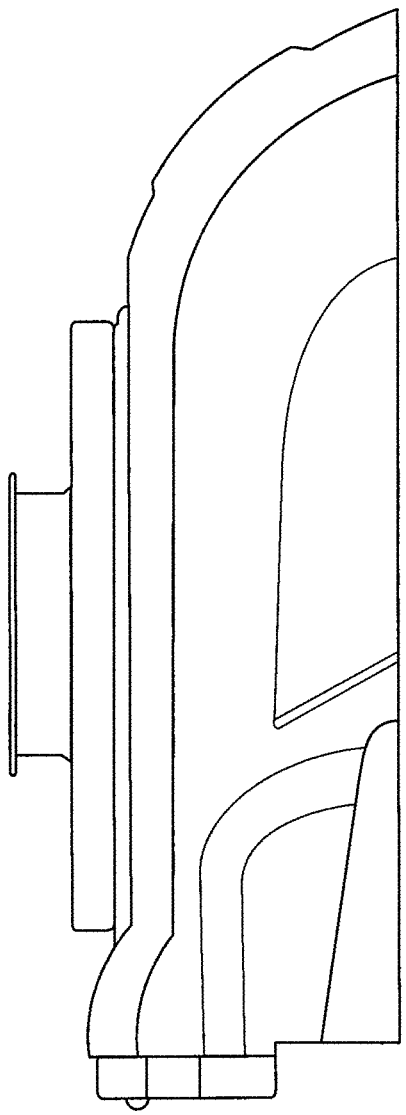
FIG. 2 is a side view of the dehumidifier adapter.
Figure 3:
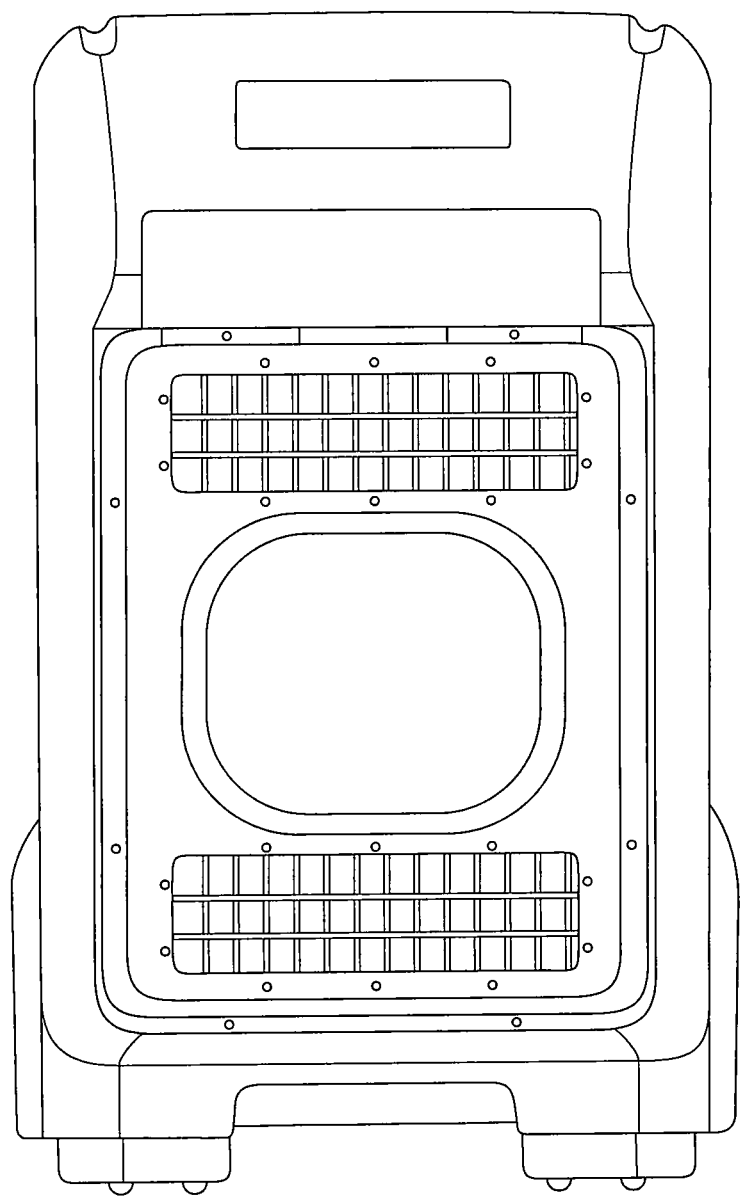
FIG. 3 is a front view of the dehumidifier adapter.

The present invention has a dehumidifier 51 that has a dehumidifier apparatus 56 held within a front shell 53. The front shell 53 is a front housing formed as a shell. The front shell has a front shell aperture 55. The front shell aperture 55 receives a dehumidifier adapter 52 formed as a plate having three openings including a pair of air control window openings 26, and a ducting hose connector opening 27.

Figure 4:
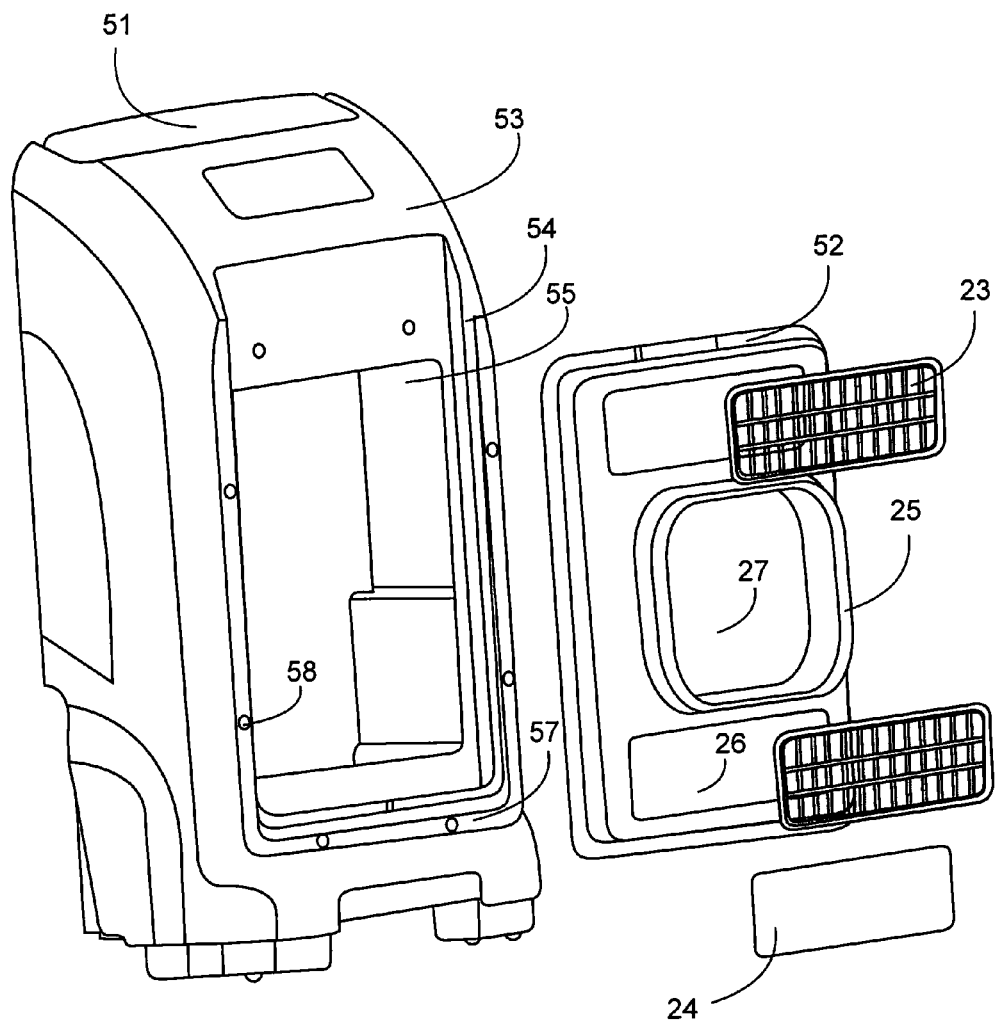
FIG. 4 is a perspective view of the dehumidifier.
Figure 5:
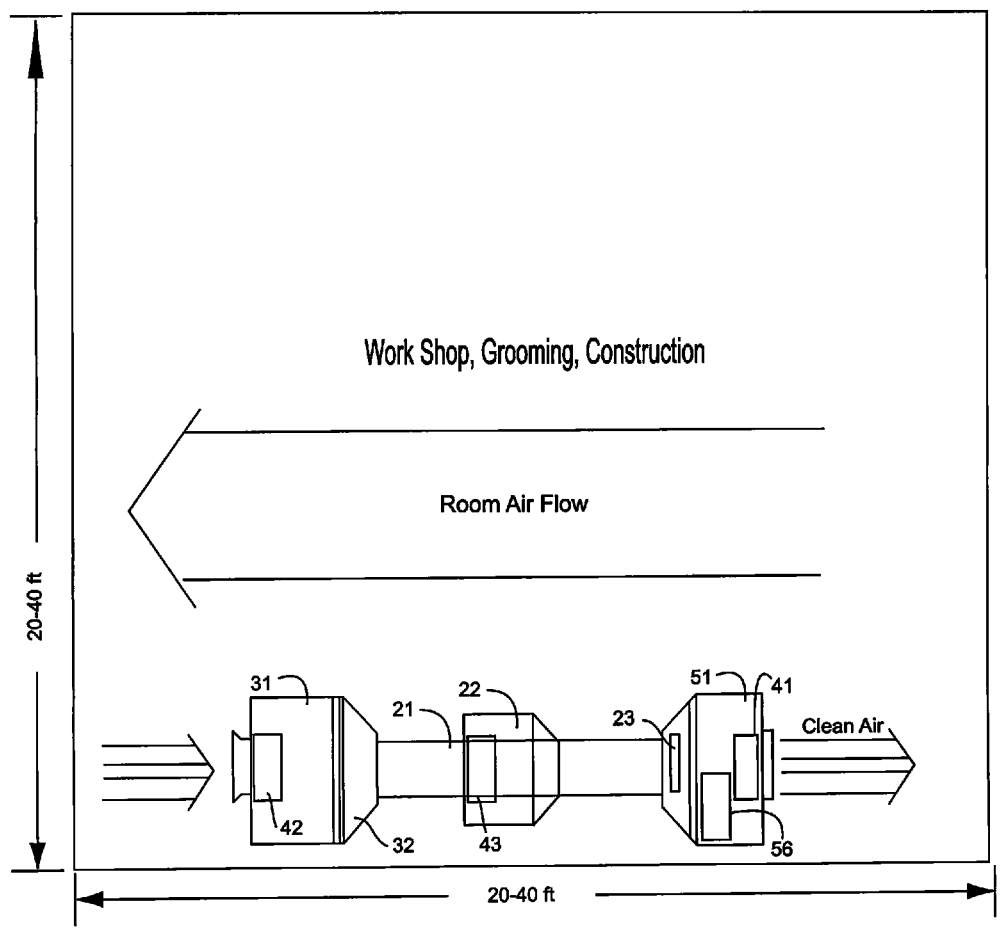
FIG. 5 is a top view of the installed system.
Figure 6:
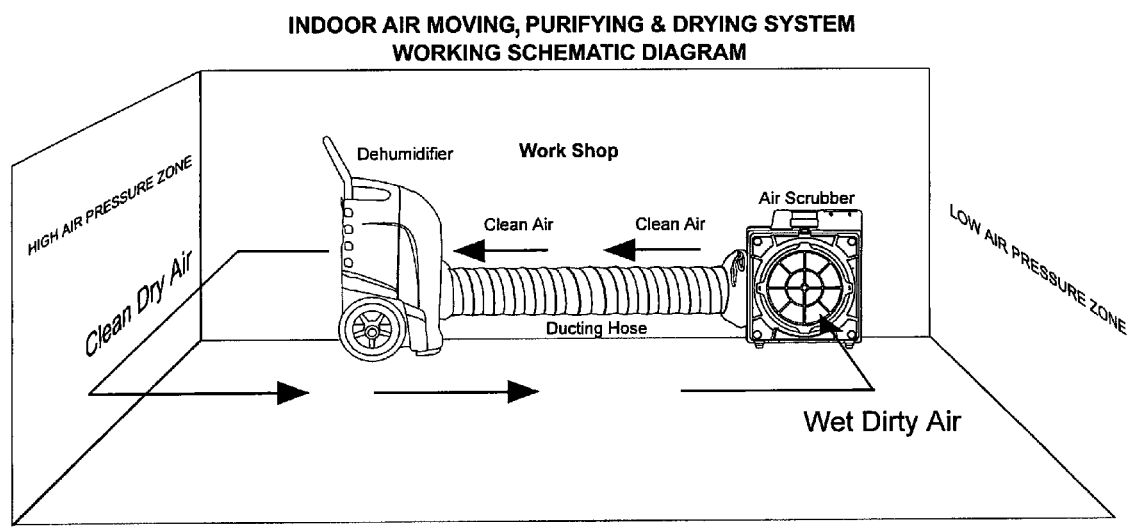
FIG. 6 is a diagram of the installed system.
Figure 7:
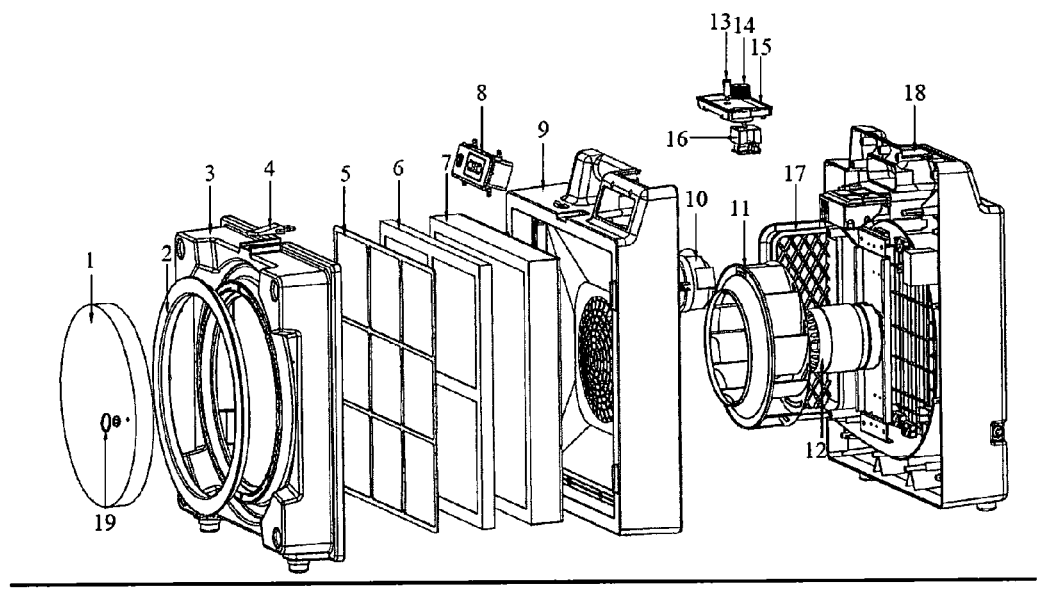
FIG. 7 is an exploded view of the HEPA air scrubber.
The following callouts of elements can be a useful guide in referencing the elements of the drawings.
1 Air Scrubber Cover
2 Air Scrubber Intake Opening Rim
3 Air Scrubber First Shell
4 Air Scrubber Latch
5 First Air Filter
6 Second Air Filter
7 Third Air Filter
8 Electronic Display
9 Air Scrubber Second Shell
10 Air Scrubber Part
11 Air Scrubber Turbine
12 And Scrubber Motor
13 Air Scrubber First Control
14 Air Scrubber Second Control
15 Air Scrubber Control Panel
16 Air Scrubber Control Circuit
17 Air Scrubber Output Opening
18 Air Scrubber Third Shell
19 Air Scrubber Cover Handle
21 Ducting Hose
22 Blower Fan Assembly
23 Air Control Window
24 Air Control Window Filter
25 Ducting Hose Connector Rim
26 Air Control Window Opening
27 Ducting Hose Connector Opening
31 Scrubber
32 Scrubber Adapter
41 Dehumidifier Fan
42 Scrubber Fan
43 Inline Blower Fan
51 Dehumidifier
52 Dehumidifier Adapter
53 Front Shell
54 Front Shell Aperture Slot
55 Front Shell Aperture
56 Dehumidifier Apparatus
57 U-Shaped Flange Bracket
58 Connection Points

The front shell aperture slot 54 is formed on the periphery of the front shell aperture 55. The front shell aperture slot 54 can be built using a U-shaped flange bracket 17 that is connected to the front shell 53 at connection points 58. Screws or connectors can connect the flange bracket to the front shell aperture 55 to form the front shell aperture slot 54. The front shell aperture slot 14 is sized to allow the sliding removal of the dehumidifier adapter 52. As seen in FIG. 4 a user can lift the dehumidifier adapter out of the front shell aperture slot 54 for cleaning and maintenance.

The ducting hose 21 can be connected to the ducting hose connector rim 25 formed on the dehumidifier adapter at a ducting hose connector opening 27. Preferably, the ducting hose connector opening 27 receives a soft air duct that is flexible and can conform to the rounded square profile of the ducting hose connector opening 27. Alternatively, the ducting hose connector opening 27 can be made in an oval or circular shape. The ducting hose connector rim 25 preferably extends beyond a flat surface of the plate shaped dehumidifier adapter 12 to form a collar around which an air duct can be attached.

The dehumidifier adapter 12 may have a pair of openings for receiving air control windows 23. The air control windows 23 are preferably formed as a plastic frame having an air control window filter 24. The air control window filter 24 can be formed of a material such as HEPA filter media that may include activated carbon or air fresheners. The air control windows 23 can be formed of a folding plastic frame having a pair of front and rear grilles to sandwich an air control window filter 24 in between. Preferably, the filter media of the air control window filter 24 can be changed without removal of the dehumidifier adapter 52 from the front shell aperture slot 54.

Rotational molding can be used for forming the dehumidifier adapter ducting hose connector rim 25. A total of eight connection points 58 can be implemented. Optionally, a metal threaded screw insert formed with the proper size screw hole can be formed onto the front shell 53. Also, the screw hole can receive a type M6 hex nut screw.

Installation in a work area includes having the ducting hose 21 space at about 10 to 15 feet in length so that the air scrubber and dehumidifier are about 10 to 15 feet apart. The installation of the portable system is in a room that is approximately 20 to 40 foot in length and 20 to 40 foot in width. The ducting hose 21 is preferably collapsible and can be held in a carrying bag in a collapsed mode. When a user desires to set up the ducting hose 21, the user can extend the ducting closed from the collapsed mode to an extended mode. Preferably, the ducting hose 21 is flexible.

The ducting hose 21 transfers air from a first side of a room to a second side of the room causing a high-pressure on the second side of the room which is the clean air exhaust side. The dehumidifier 51 and scrubber 31 are separately placed on opposite sides of a room. For example, in a dehumidification and scrubbing system for a pet salon at approximately 500 to 1000 ft.$^2$, the dehumidifier is preferably placed along one side of the wall and the scrubber also placed along one side of the wall with the air duct running along one side of a wall of a rectangular shaped room. The system should be in a closed indoor space, and windows may have to be closed for the high-pressure side airflow to return to the low pressure side of the system. By having a closed loop, the system can provide a consistent and constant airflow to improve conditions in a work area within a closed room. In a 1,000 square foot room the air duct needs to be at least about 10 feet long.

The air windows exhaust air when the dehumidifier fan 41 is working less than the in-line blower fan 43, or the scrubber fan 42. Air pressure differential within the ducting hose 21 is exhausted through the air control windows 23. The air control windows 23 are preferably generally parallel to the plane of the front shell aperture 55. Exhaust air is preferably HEPA quality and clean filtered and dehumidified air. Alternatively, the air windows are air intake windows when the dehumidifier fan 41 is working, but the scrubber fan 42 has stopped for some reason. The dehumidifier module and scrubber module have independent controls and are independent units that can be used separately for dehumidifying and scrubbing.

An optional blower fan assembly 22 can be included as an in-line fan that increases the air pressure differential along the ducting hose 21 when distances longer than 20 feet are desired. The optional air blower fan assembly 22 can be connected to the ducting hose 21 at both ends of the ducting hose 21, namely the exhaust end and the intake end of the optional blower fan assembly 22. The blower fan assembly 22 has an inline blower fan 43.

The system is designed to be portable and removable and can be installed and uninstalled as needed in a variety of different indoor spaces. After use, the system packs up into three separate components that can be hand carried separately, namely a dehumidifier module 51, a scrubber module 31, and an accessories module. The accessories model includes the air duct and optionally a blower fan assembly 22. The modules are sized to allow manual carrying, and can be adapted with handles for grip and wheels for transportation in a configuration similar to rolling luggage.

An HEPA air scrubber 31 includes an air scrubber cover 1 that fits over an air scrubber intake opening rim 2. An air scrubber first shell 3 latches with an air scrubber latch 4 to retain a first air filter 5, a second air filter 6, and a third air filter 7 below an electronic display 8. The air filters are sandwich between the first shell and the air scrubber second shell 9. The air scrubber may also have additional air scrubber parts 10 within the air scrubber second shell including an air scrubber turbine 11, and air scrubber motor 12. An air scrubber first control 13 with an air scrubber second control 14 can be nothing to an air scrubber control panel 15 that is controlled by an air scrubber control circuit 16. The air scrubber has an air scrubber output opening 17 mounted on a side between the air scrubber third shell 18 and the air scrubber second shell. The air scrubber has an air scrubber cover handle 19 for removing the cover.

The invention claimed is:

1. A dehumidifier air filter system comprising:
   a. a dehumidifier module;
   b. a scrubber module;
   c. a dehumidifier adapter connected to the dehumidifier module;
   d. an air duct connecting the dehumidifier module to the scrubber module, wherein the air duct connects to the dehumidifier module at the dehumidifier adapter;
   e. an air control window formed on the dehumidifier adapter;
   f. a front shell forming a housing for the dehumidifier apparatus within the dehumidifier module, wherein the front shell has a front shell aperture, wherein the front shell aperture receives the dehumidifier adapter, wherein the dehumidifier adapter is formed as a plate having at least two openings including: an air control window opening, and a ducting hose connector opening, wherein the front shell aperture slot is formed on the periphery of the front shell aperture, wherein the front shell aperture slot is formed by a flange bracket that is connected to the front shell at connection points, wherein the air duct has two modes including an expanded deployed mode and a contracted stowed mode, wherein the air duct is at least 10 feet long in expanded deployed mode, wherein the air duct is configured to be connected to a ducting hose connector rim formed on the dehumidifier adapter at a ducting hose connector opening, wherein the dehumidifier adapter has a pair of openings for receiving a pair of air control windows, wherein the air control windows are formed as a frame adapted to retain air control window filters; and
   g. an in-line fan mounted to the air duct between dehumidifier module and the scrubber module.

2. The dehumidifier air filter system of claim 1, wherein air pressure differential within the ducting hose is exhausted through the pair of air control windows.

3. The dehumidifier air filter system of claim 1, wherein the pair of air control windows operate as both air intake windows and air exhaust windows.

4. The dehumidifier air filter system of claim 1, wherein the ducting hose is collapsible and is stored in a carrying bag when in collapsed mode.

5. The dehumidifier air filter system of claim 1, wherein the air control windows are generally parallel to the plane of the front shell aperture.

6. The dehumidifier air filter system of claim 1, wherein air pressure differential within the ducting hose is exhausted through the pair of air control windows, wherein the pair of air control windows operate as both air intake windows and air exhaust windows, wherein the ducting hose is collapsible and is stored in a carrying bag when iii collapsed mode, wherein the air control windows are generally parallel to the plane of the front shell aperture.

* * * * *